United States Patent [19]

Nordbryhn

[11] Patent Number: 4,996,440
[45] Date of Patent: Feb. 26, 1991

[54] DEVICE FOR MEASURING DIMENSIONS
[75] Inventor: Andreas Nordbryhn, Nilserudkleiva, Norway
[73] Assignee: Tomra Systems A/S, Asker, Norway
[21] Appl. No.: 533,360
[22] Filed: Jun. 5, 1990
[30] Foreign Application Priority Data
Jun. 22, 1989 [NO] Norway ................. 892596
[51] Int. Cl.[5] ......................... G01N 21/86
[52] U.S. Cl. ......................... 250/561; 356/5
[58] Field of Search ............ 250/561, 234–236; 356/5; 350/6.9

[56] References Cited
U.S. PATENT DOCUMENTS
4,279,472  7/1981  Street ......................... 250/235
4,311,384  1/1982  Keene ......................... 356/5

Primary Examiner—David C. Nelms
Attorney, Agent, or Firm—Rodman & Rodman

[57] ABSTRACT

A device for measuring one or a plurality of regions of an object to be able to determine one or a plurality of dimensions of said object, comprising a means (3, 1, 6) for directing a light beam towards said object, a means (6, 1, 9) for receiving light beams (8) which are reflected from said object, and a means (54, 57–64) for calculating the travel time of the beam to and from said object, with a means (56) causing the light beam to be modulated with a fixed frequency ($f_0$), and a means (1, 2, 6) causing the light beam to sweep across said object at a defined angle/defined angles relative to a fixed plane of reference during the entire sweeping operation, the light (8) that is reflected by said object returning to intercepting means (9), via said light beam sweeping means (6, 1, 2).

18 Claims, 7 Drawing Sheets

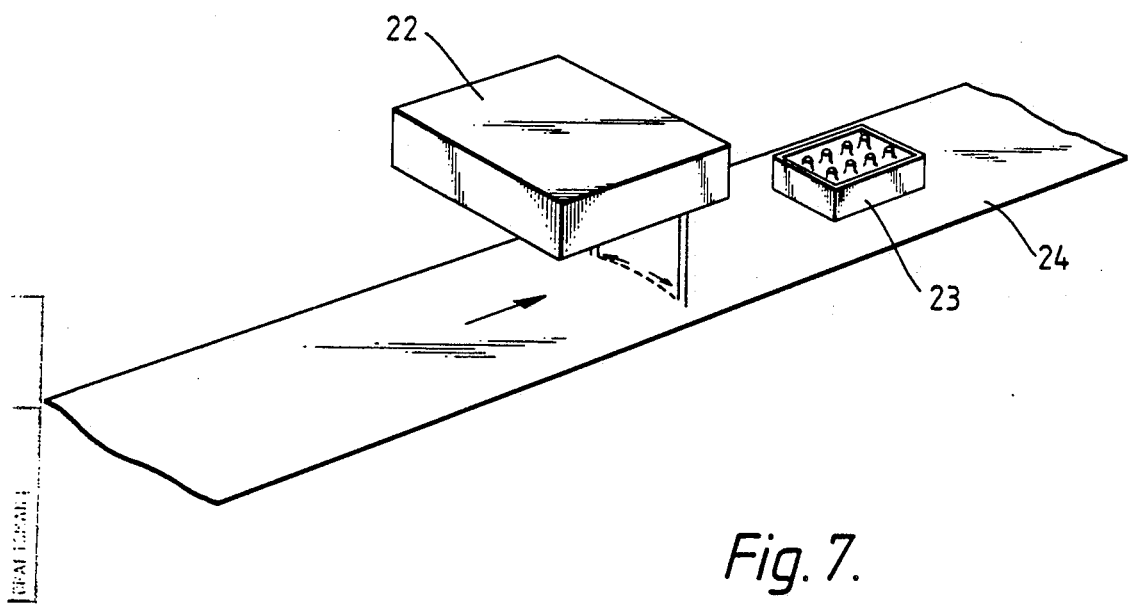
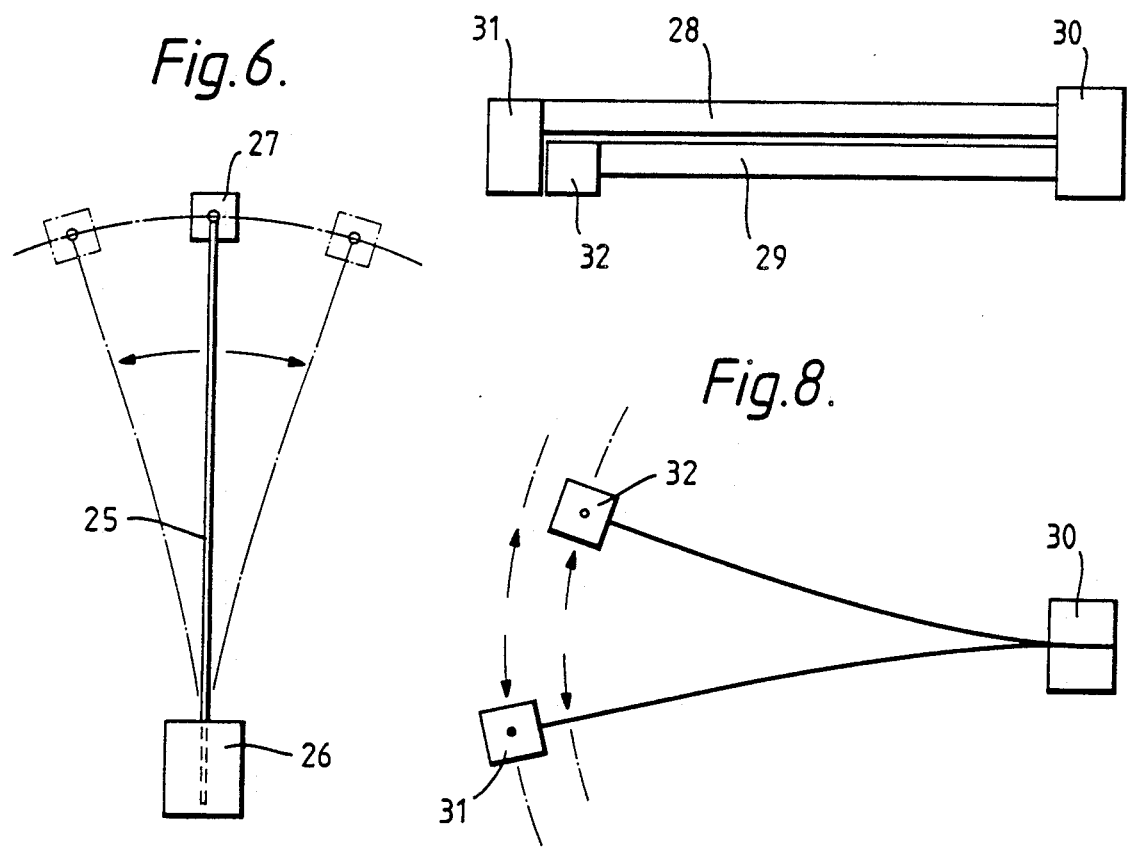

DEVICE FOR MEASURING DIMENSIONS

The present invention relates to a device for measuring the distance to one or a plurality of regions ON an object to permit measuring of at least one dimension of said object, comprising a means which directs a light beam towards said object, a means intercepting the light beams which are reflected from said object, and a means calculating the beam travel time to and from said object.

Several such concepts for measuring the distance to one or a plurality of regions of an object are previously known. Among others, there exist such devices for measuring dimensions in connection with so called automatic focus cameras, equipment for instrument approach, and so called electronic metering bars.

For a long time, there was, however, a need for being able to measure the distance to one or a plurality of regions of an object with great accuracy, e.g. with a measuring accuracy of 1 mm or better.

The device mentioned above is characterized in a means causing the light beam to sweep across the object normally to a fixed reference level during the entire course of sweeping, and with relative movement between the device and the object(s) to be measured, the light being reflected from the object travelling back to an intercepting means, via said light beam sweeping means.

The device may be embodied in several manners within the same inventive idea.

According to a first embodiment it is proposed according to the invention that the sweeping means comprise at least one inclined rotating flat mirror which reflects the beam from a centre of a hollow truncated cone towards a reflecting inner face of the truncated cone, and that the beam reflected from the object goes back to said intercepting means, via said inner face and mirror. The light beam is emitted towards said rotating mirror by the aid of a small inclined stationary mirror, and the light beam reflected by the object will only reach the intercepting means with that part of the light beam which is not screened by said small stationary mirror.

According to a second embodiment it is proposed that the sweeping means consists of at least one pendulum swinging in a horizontal plane. According to a proposed modification of this concept the sweeping means comprises two pendulum members swinging in push-pull in parallel horizontal planes. Said pendulum or pendulum members may consist of a leaf spring, and at least one light emitting and light receiving means is provided on said leaf spring.

In a third embodiment it is suggested that the sweeping means consists of a rotating disk with at least one pair of light emitter and light receiver provided on said disk.

According to a fourth embodiment where the device is movable and the object is kept stationary it is, furthermore, proposed that the sweeping means may comprise at least one bar with a plurality of light emitter/light receiver pairs, with the longitudinal direction of the bar extending across its directions of movement. Preferably, two bars may be provided which move in antiphase in separate respective horizontal planes.

In a fifth embodiment the sweeping means may consist of a hollow rod which is designed to be an electromagnet and is slidable forth and back relative to a magnetic core and is spring biased, said bar being provided with two or more light emitter/light receiver pairs.

Even though the present device may be utilized for measuring at least one dimension of any object, an essential feature is, however, that the object is able to reflect light in the same direction in which it is received.

In a preferred embodiment of the present invention the invention is especially intended for objects in the shape of bottles or bottle crates with bottles.

The invention is now to be disclosed in more detail with reference to the following disclosure and accompanying drawings, and it should be understood that what is shown and disclosed is only meant to facilitate understanding of the invention, but is in no way to be considered as limiting the scope of the invention, as defined in the claims.

FIG. 5 illustrates the device according to the invention, in which the sweeping means is stationary per se, whereas the object to be measured moves past the sweeping means.

FIG. 6 illustrates a sweeping means with a pendulum which is movable in a horizontal plane.

FIGS. 7 and 8 show an elevational view, and a plan view, respectively, of two pendulum members which are movable in push-pull action and in respective horizontal planes.

Figure 1:
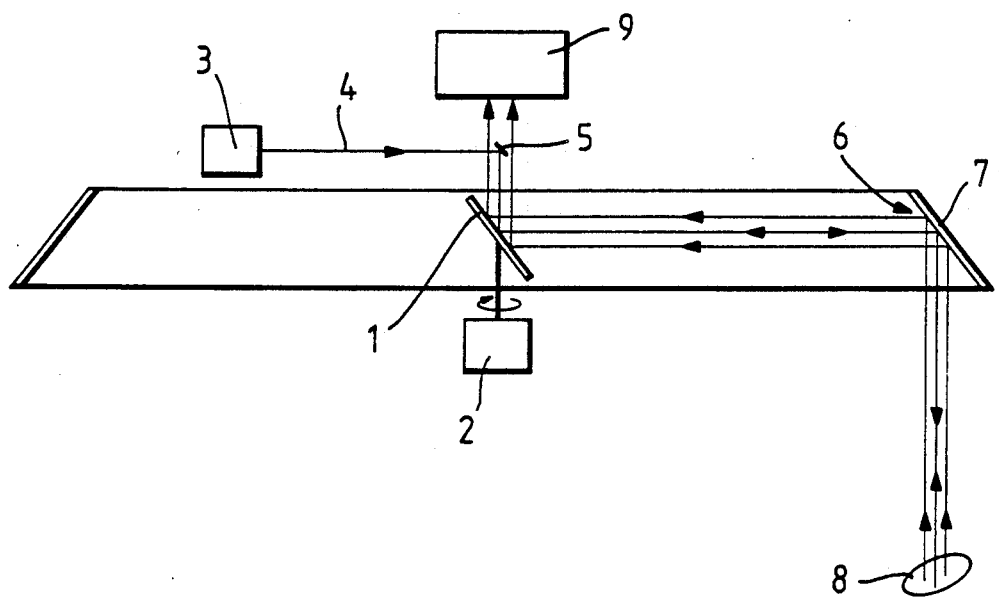
FIGS. 1 and 2 illustrate the principle of a first sweeping means according to the invention in a cross sectional view, and a top view, respectively.

In FIG. 1 a sweeping means is shown, which consists of at least one rotating flat mirror 1 which is rotated by the aid of a motor 2. Mirror 1 receives a light beam, preferably from a laser 3, which emits light beam 4, via a small inclined mirror 5. Beam 4 is reflected by flat mirror 1 towards a reflecting inside face 6 of a hollow truncated cone 7. Beams 8 which are reflected by an object (not shown in FIG. 1) are reflected back to a light receiver 9, via said inside face 6 and flat mirror 6. It will be understood that said inside face 6 and flat mirror 1 must be mutually parallel, i.e. have the same angle relative to the horizontal.

Figure 2:
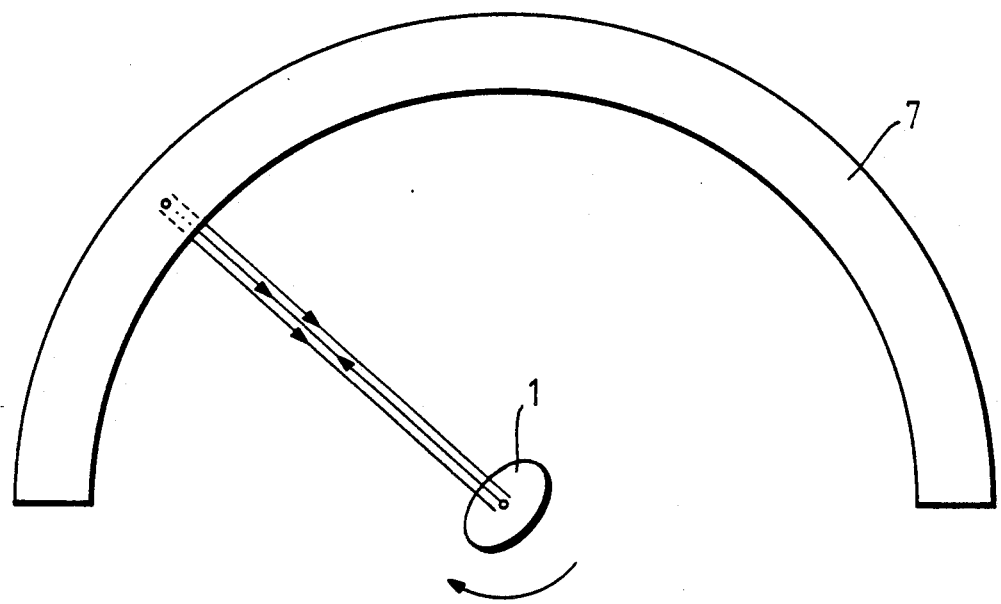

In FIG. 2 the device is shown from above. It will appear that, in fact, only 180° of the hollow truncated cone are used. However, there is nothing preventing utilization of the entire 360° of the hollow truncated cone. As will appear from FIG. 1, light beam (8) which is reflected by the object will reach intercepting means 9 only with that portion of the light beam which is not screened by said stationary small mirror 5. Since the reflected light will be slightly more dispersed than the emitted light, it will be obvious that the screening occurring due to mirror 5 is of minor consequence provided that means 9 receives reflected light.

Figure 3:
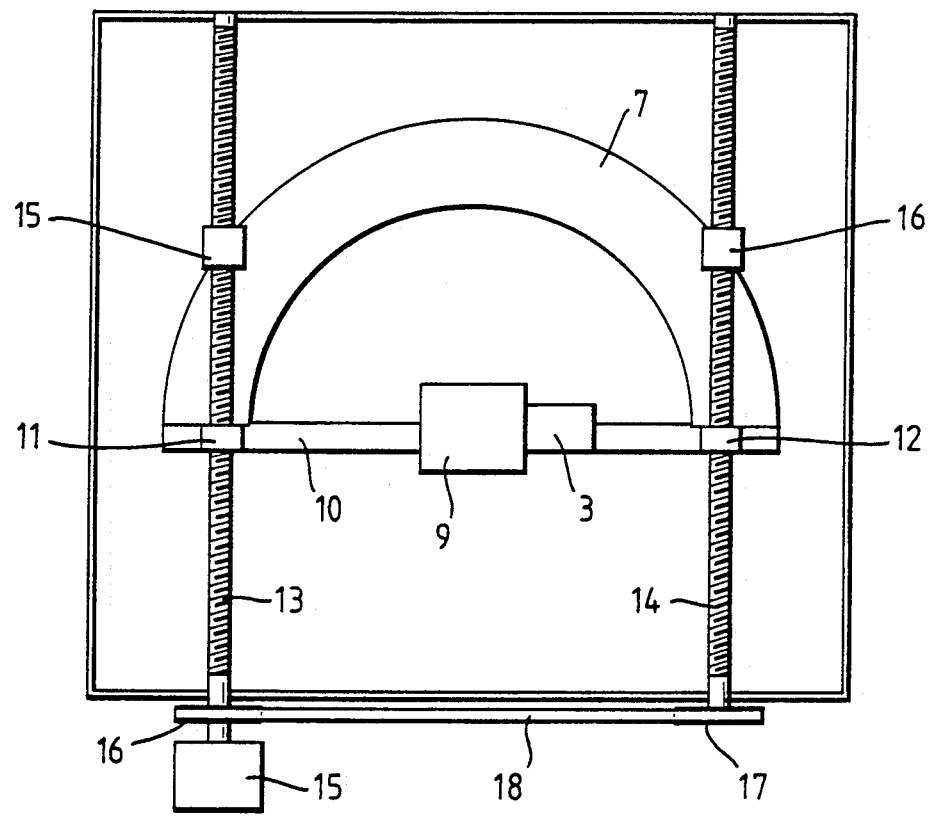
FIG. 3 illustrates the sweeping means of FIGS. 1 and 2, as arranged in a movable frame.

In FIG. 3 the means of FIGS. 1 and 2 is shown to be mounted in a movable frame. Sweeping means of FIGS. 1 and 2 is suitably limited by supporting bar 10, which at respective ends guide members 11 and 12 for engagement with screws 13, and 14, respectively. In connection with truncated cone 7 proper there may, correspondingly, be provided guide members 15 and 16 for engagement with screws 13 and 14. Screws 13 and 14 are drived by a common motor 15, with pulleys 16, 17 provided to screw 13, and 14, respectively, and with pulleys 16, 17 being mutually connected by a belt 18. Alternatively, pulleys 16, 17 may be gear wheels and belt 18 may consist of a chain.

Figure 4:
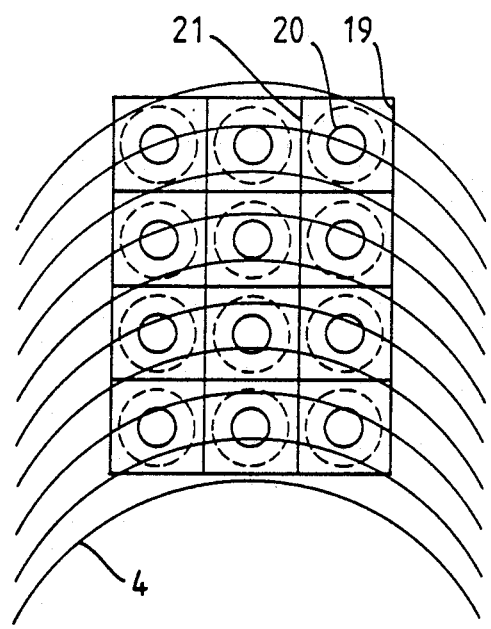
FIG. 4 is a simplified view of the movement of the sweeping means across a bottle.

In FIG. 4 a bottle crate 19 with bottles 20 in it and with partition walls 21 separating respective bottles is schematically shown. Numeral 4 indicates sweeps of the light beem down towards object 19, 21, when the sweeping means is moved by the aid of screws 13, 14 across a crate 19. It will be understood that the number of sweeps shown in FIG. 4 is only illustrative and that the real number of sweeps will be considerably higher, so that sweeping curves will be more dense.

What is shown in FIG. 4 is valid both when the object to be measured is moving below a stationary sweeping means, and if the sweeping means moves across a stationary object to be measured.

In FIG. 5 a stationary measuring device 22 is schematically shown, which may, e.g. be of the design as shown in FIGS. 1 and 2, with an object 23 moving by the aid of a conveyor 24 past and below sweeping means 22. In FIG. 6 a means sweeping in the horizontal plane and designed like a pendulum is shown. The pendulum may, e.g. consist of a leaf spring steel member 25, a suspension means 26, and a combined light emitter and light receiver 27. The pendulum is indicated in its respective extreme positions by dashed lines, whereas the pendulum shown in full lines indicates the initial or intermediate position.

In the concept of FIGS. 7 and 8 the pendulum of FIG. 6 is shown in a modified design. Sweeping means in this case comprises a first pendulum 28, and a second pendulum 29. Pendulum 28 is of a larger radial extent than pendulum 29. Pendulum members 28 and 29 may each consist of a leaf spring steel member and may be suspended in a common suspension means 30. At the extreme end of pendulum 28 a combined light emitter and light receiver means 31 is provided. Correspondingly, a combined light emitter and light receiver means 32 is provided at the extreme end of pendulum 29.

Even though only one light emitter and light receiver means 27 is shown on pendulum 25, two or more light emitter/receiver means may obviously be provided along the radial length of the pendulum. The same possibility partly also exists for the concept of FIGS. 7 and 8, but said light emitting/receiving means must not show larger height than the leaf spring member so as to prevent the means on respective pendulum members from colliding when they swing past each other.

Figure 9:
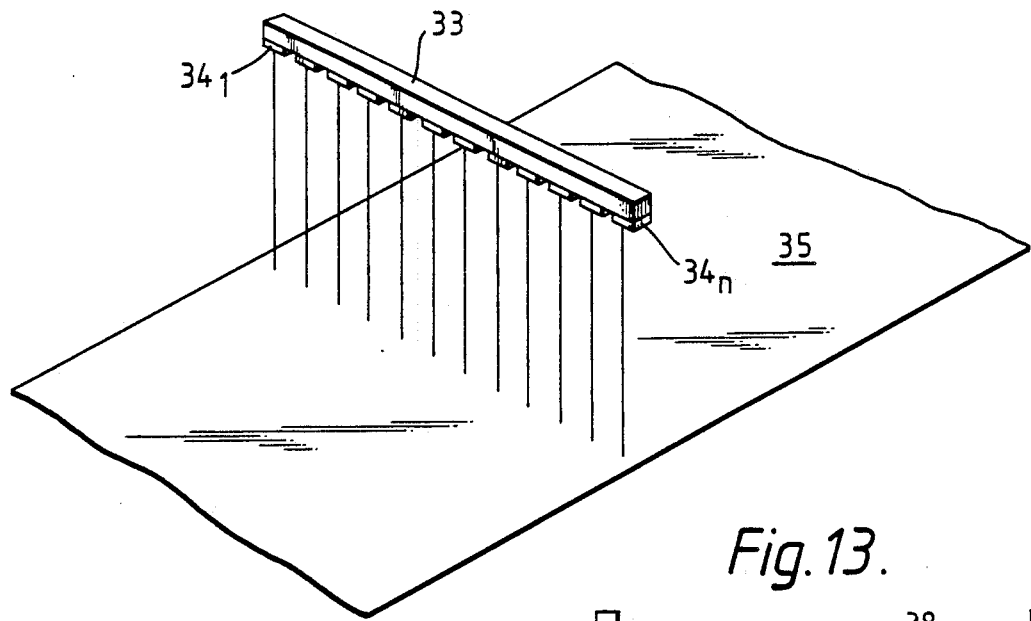
FIG. 9 illustrates a sweeping means which may either be stationary or movable relative to a conveyor belt.
Figure 10:
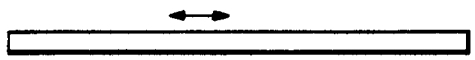
FIG. 10 is a schematical illustration of the device of FIG. 9 to indicate its movability forwards and backwards in its longitudinal direction.

FIG. 9 illustrates a sweeping means 33 comprising a plurality of light emitter/light receiver units $34_1 \ldots 34_n$. As will appear from FIG. 9 the light beam is directed normally onto a fixed reference plane 35, which may in the present case consist of a conveyor for the object or objects to be examined by the sweeping means. As schematically illustrated in FIG. 10, the sweeping means may be designed to be movable back and forth in its longitudinal direction by the aid of a mechanism not shown. The total movement back and forth need not have an extent of more than the distance between the beams from respective light emitter/receiver means $34_1$-$34_n$.

Figure 11:
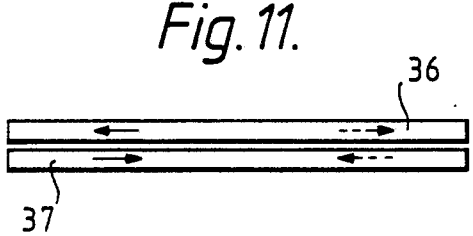
FIG. 11 illustrates a modification of the device of FIG. 10, in which two parallel pendulum members are provided to sweep in a mutual push-pull action.

FIG. 11 shows how two scanning means operating in parallel may be used, both means being designed like scanning means 33, 34. Scanning means 36 and 37 are designed to operate in antiphase to provide systematic and repeated scanning across the object to be examined.

Figure 13:
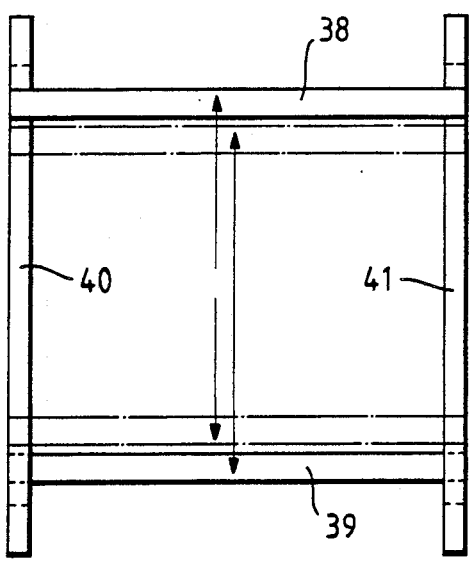
FIGS. 13 and 14 illustrate how the device of FIG. 11 may be modified in order to move said sweeping means in a push-pull action relative to there longitudinal extension.
Figure 12:
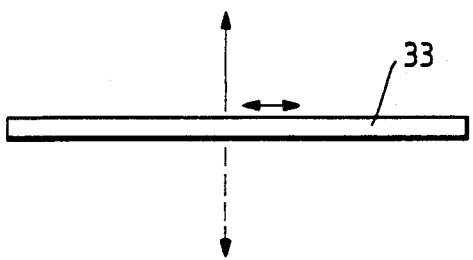
FIG. 12 illustrates a sweeping means like that of FIG. 10, but in which the sweeping means is also movable across its longitudinal extension.

FIG. 13 illustrates a scanning means 33, like that shown in FIG. 10, with the scanning means additionally being caused to move back and forth across its longitudinal direction by the aid of means not shown. Said means, however, may be of a kind substantially as shown in FIG. 3.

Figure 14:
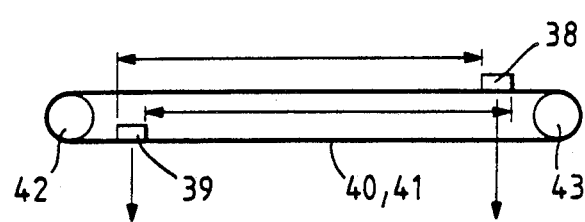

FIGS. 13 and 14 illustrate a further embodiment with the object to be examined preferably being stationary below the sweeping means. The sweeping means in this case comprises two scanning bars 38 and 39, which by the aid of drive mechanisms 40 and 41 may be caused to move across the object in antiphase. In this manner each bar 38, 39 will overlap the scanning area of the other one and will, thus, provide a higher resolution of measurement. An additional modification which may be considered, but is not shown, is that the bars may be caused to move a short distance back and forth during scanning operations, as originally disclosed in connection with FIG. 11.

In FIG. 14 the device of FIG. 13 is shown in a manner in which it might be implemented. The downwards directed arrows illustrate the light beams from respective light emitters on the bars 38 and 39 of the sweeping means. Bars 38 and 39 may, as shown, be provided in mutually spaced horizontal planes and they may be mounted on belts 40, 41, which are movable across pulleys 42, 43.

Figure 15:
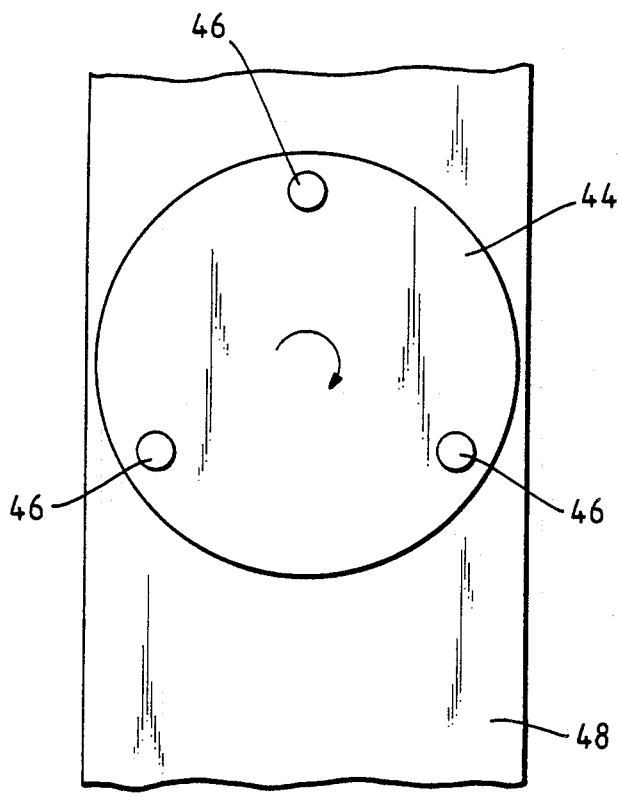
FIG. 15 illustrates the device according to the invention, in which the sweeping means is designed to be a rotating disk.

FIG. 15 illustrates a further embodiment of the light beam sweeping means as seen from above. In the shown embodiment the device comprises a rotating disk 44, which is driven by a motor 45, see FIG. 16. On the disk two or more light emitter/light receiver means 46 are provided. When disk 44 is rotated sweeping means 46 will be caused to sweep across objects 47 in arcs of a circle, and the more means 46 there are, the higher will the resolution of measurement be.

Figure 16:
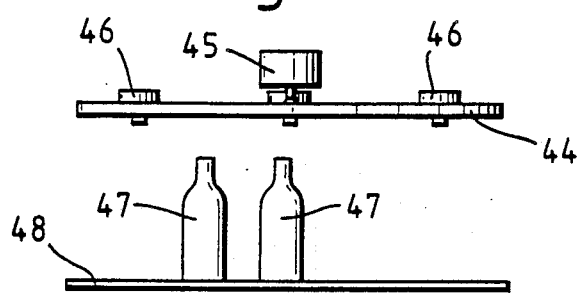
FIG. 16 illustrates the device of FIG. 15 as seen in a vertical elevation.

As shown in FIG. 16 the objects in the shown embodiment are bottles, provided on a support 48, e.g. a conveyor. The conveyor may be movable during the scanning process or the sweeping means 44, 45, 46 may be made movable by the aid of a technical concept approximately like the concept shown in FIG. 3, e.g. by providing the sweeping means suspended from the rotor axle of motor 45. The relative movability of sweeping means and object to be measured is, thus, present.

Figure 17:
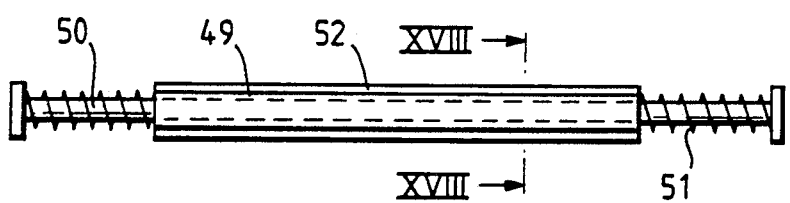
FIG. 17 illustrates a further embodiment of the device according to the invention.
Figure 18:
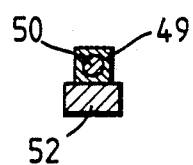
FIG. 18 shows a sectional view along XVIII—XVIII in FIG. 17.

In FIGS. 17 and 18 another variant of the sweeping means as disclosed above is shown. Here the sweeping means consists of a hollow bar 49 which is designed to be an electromagnet and is slidable back and forth relative to a magnetic core 50 as well as being spring biased 51 by the aid of a spring at each end. Said bar is provided with a rod 52 with two or more pairs of light emitter/light receiver. When the electromagnet is supplied with current of a predetermined polarity and frequency, the bar with pairs of light emitter/light receiver will be caused to swing forth and back along said magnetic core 50. In order to obtain lateral stability the magnetic core 50 and bar 49 may be provided with corresponding engagement means to prevent lurching. It should, however, be understood that modifications may readily be made of the device shown in FIGS. 17 and 18 and that technical equivalents are possible without departure from the inventive idea.

Figure 19:
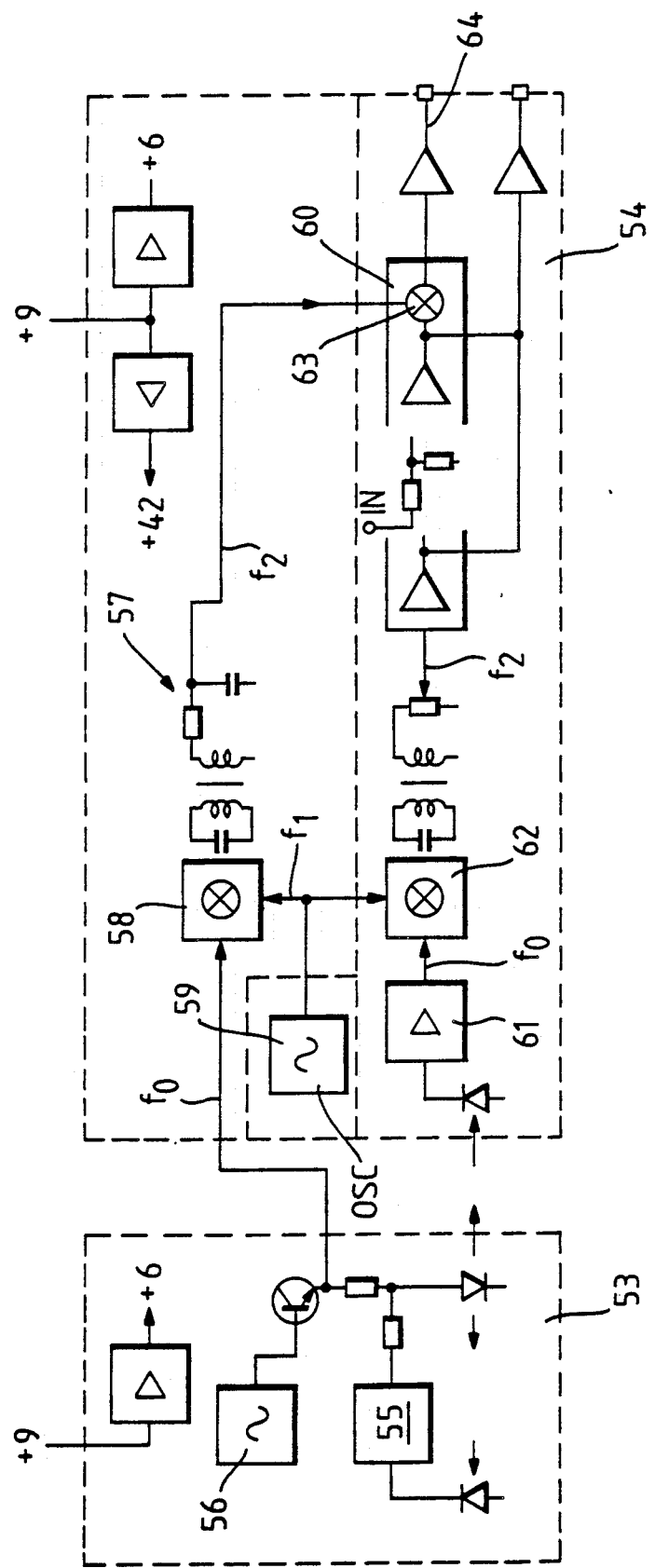
FIG. 19 illustrates the build-up of an emitter and receiver means for emitting light and receiving reflected light and for determining phase and intensity of the same.

In FIG. 19 a light emitter 53 and a light receiver 54 are illustrated. The light emitter is provided with a light generator 55, e.g. a laser, and a modulator 56, e.g. a sine wave generator or a pulse modulator with a high frequency, preferably in the range of 46.8 MHz. Modulation frequency $f_0$ is transmitted to a reference circuit in the receiver. In said reference circuit 57 the first frequency $f_0$ is supplied to a first input of a mixer stage 58. A second input of mixer stage 58 is connected with an oscillator or pulsing circuit 59 emitting signals of a frequency $f_1$ which is lower than $f_0$, e.g. 46.345 MHz. Output signal having a frequency $f_0 - f_1 = f_2$ is supplied to a first input of a mixer stage of a detector 60. The light signal intercepted by receiver 54 is supplied to a pre-amplifier 61, and the output from the latter with a frequency $f_0$ is supplied to a mixer circuit 62 which is part of the pre-amplifier. In mixer stage 62 frequency $f_0$ is mixed with frequency $f_1$, to provide frequency difference $f_0 - f_1 = f_2$ on input to detector 60. Signal $f_2$ from the pre-amplifier is amplified in the amplifier and supplied to mixer stage 63 in detector 60. On the output from the mixer stage, numeral 64 in FIG. 19, the phase difference between signal $f_0$ from light emitter 53 and the signal with frequency $f_0$ which is received on pre-amplifier stage 61 can, thus, be measured like a signal. Said phase difference will be a direct expression of the distance from light emitter to object and is, thus, a direct determination of the dimension of the object at the point in question.

It is also possible to obtain the intensity of the received signal from the detector, which intensity will obviously, be stronger in case there is an unequivocal reflexion directly back to the light receiver than when dissipation back is diffuse. The image of intensity received will also contribute to determination of the dimensions of the object, since the intensity, among others, depends on the distance to the object, its colour (e.g. dull), and specular reflexion. If the intensity of the signal influences the distance signal the distance may be corrected by the intensity of the signal.

Figure 20:
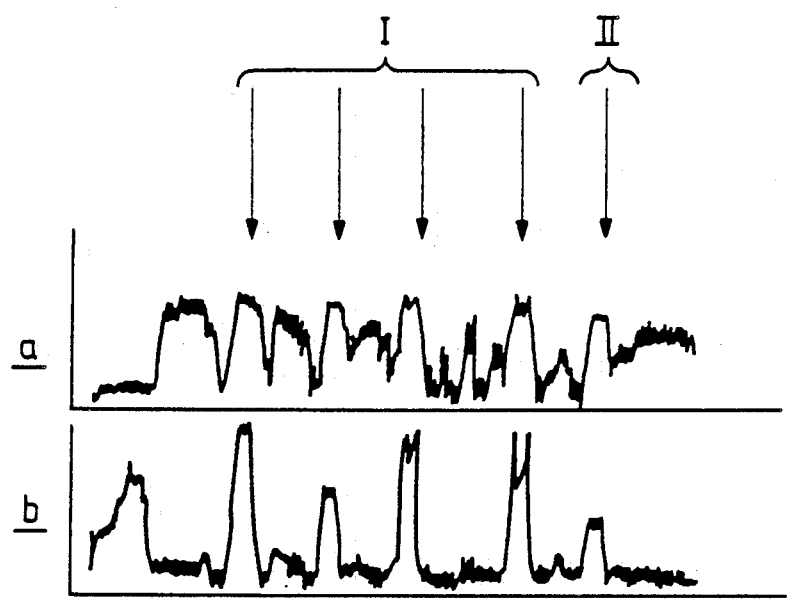
FIG. 20 illustrates experimental signal diagrams of phase, and signal intensity, respectively, of reflected light.

FIG. 20 illustrates an experimental signal diagram, based on a signal from a scanning or sweeping line by the aid of a distance meter according to the invention.

The target object in the shown case was a bottle crate with bottles in the crate. FIG. 20a represents the signal diagram of measured phase which in reality corresponds to the measured distance, whereas FIG. 20b represents the measured intensity of signals in time according to the same scale as in FIG. 20a. Arrows marked I indicate unequivocal peaks of the signal flow indicating reflective surfaces of bottles. II indicate the edge of the crate.

Even though the signals in FIG. 20a show a low signal/noise ratio, this may readily be improved by use of a strong source of light or a detection circuit with improved detection of phase difference indicated by signal peaks. Due to the signals received according to FIG. 20b, i.e. the intensity of received signals, it will be easy to pick out the portions of the received phase signal indicating the object to be examined. Even if the intensity of signals of bottle tops may vary slightly, it is characteristic of what is shown in FIG. 20a that the amplitudes of the phases of interest are approximately the same.

As opposed to previously known devices the present invention is, thus, based on the fact that it is desired to search for and measure the distance to existing reflecting faces by use of a known, fixed angle. Additionally, the distance to all diffusely reflecting surfaces will of course also be measured. In known measuring of dimensions, e.g. as known from automatically focussing cameras, reflecting surfaces are most emphatically undesired, because this may readily result in undefinable distance measuring.

According to the invention an essential feature is, thus, that there is a fixed angle of the scanning beam relative to a reference plane.

Having described my invention, I claim:

1. A device for measuring the distance to one or a plurality of regions of an object in order to be able to determine one or a plurality of dimensions of said object, a means for directing a light beam towards said object, a means for intercepting the light beams that are reflected from said object, and a means for calculating the travelling time of the beams to and from said object, characterized in a means causing the light beam to sweep across said object normally to a fixed reference plane during the entire sweeping operation, and with relative movement between the device and the object(s) to be measured, the light reflected by said object going back to an intercepting means, via said light beam sweeping means.

2. A device as stated in claim 1, characterized in that the sweeping means consists of at least one inclined rotating flat mirror which reflects the beam from the centre of a hollow truncated cone towards a reflecting inside surface of said truncated cone, and that the beam reflected by the object goes back to said intercepting means, via said inside surface and mirror.

3. A device as stated in claim 2, characterized in that only part of the reflecting inside surface of the truncated cone is used.

4. A device as stated in claim 2, characterized in that the light beam is emitted towards said rotating mirror by the aid of a small inclined stationary mirror, and that the light beam which is reflected by the object only reaches the intercepting means with the portion of said light beam which is not screened by said small stationary mirror.

5. A device as stated in claim 3, characterized in that the light beam is emitted towards said rotating mirror by the aid of a small inclined stationary mirror, and that the light beam which is reflected by the object only reaches the intercepting means with the portion of said light beam which is not screened by said small stationary mirror.

6. A device as stated in claim 1, characterized in that the sweeping means consists of at least one pendulum swinging in a horizontal plane.

7. A device as stated in claim 1, characterized in that the sweeping means comprises two pendulum members which swing in push-pull in parallel horizontal planes.

8. A device as stated in claim 5, characterized in that the pendulum is a leaf spring.

9. A device as stated in claim 6, characterized in that each of said pendulum members is a leaf spring.

10. A device as stated in claim 8, characterized in that at least one light emitting and light receiving means is provided on said leaf spring.

11. A device as stated in claim 9, characterized in that at least one light emitting and light receiving means is provided on each of said pendulum members.

12. A device as stated in claim 1, characterized in that the sweeping means consists of a rotating disk with at least one pair of a light emitter and a light receiver provided on said disk.

13. A device as stated in claim 1, characterized in that the sweeping means comprises at least one bar with a plurality of light emitter/light receiver pairs with the longitudinal direction of said bar extending transversally of its direction of movement.

14. A device as stated in claim 10, characterized in that two bars are provided, which move in push-pull in mutually spaced respective horizontal planes.

15. A device as stated in claim 1, characterized in that the sweeping means comprises a hollow bar which is designed to be an electromagnet which is slidable back and forth relative to a magnetic core and is spring biased, said bar being provided with two or more light emitter/light receiver pairs.

16. A device as stated in claim 1, characterized in that said object is a bottle.

17. A device as stated in claim 1, characterized in that said object is a crate with bottles.

18. A device as stated in claim 3, wherein the part of the truncated cone used spans 180°.

* * * * *